| (12) | United States Patent<br>Traykov et al. | (10) Patent No.: US 10,372,545 B2<br>(45) Date of Patent: Aug. 6, 2019 |
|---|---|---|

(54) SAFE RESET TECHNIQUES FOR MICROCONTROLLER SYSTEMS IN SAFETY RELATED APPLICATIONS

(71) Applicant: Infineon Technologies AG, Neubiberg (DE)

(72) Inventors: Boyko Traykov, Munich (DE); Veit Kleeberger, Munich (DE); Rafael Zalman, Markt Schwaben (DE)

(73) Assignee: Infineon Technologies AG, Neubiberg (DE)

( * ) Notice: Subject to any disclaimer, the term of this patent is extended or adjusted under 35 U.S.C. 154(b) by 32 days.

(21) Appl. No.: 15/456,870

(22) Filed: Mar. 13, 2017

(65) Prior Publication Data

US 2018/0260280 A1 Sep. 13, 2018

(51) Int. Cl.
*G06F 11/00* (2006.01)
*G06F 11/14* (2006.01)
*G06F 11/22* (2006.01)

(52) U.S. Cl.
CPC ...... *G06F 11/1441* (2013.01); *G06F 11/1438* (2013.01); *G06F 11/2221* (2013.01)

(58) Field of Classification Search
CPC ............. G06F 11/1441; G06F 11/1438; G06F 11/2221; G06F 11/2247; G06F 11/2278; G06F 11/2284; G06F 11/2289; G06F 11/2736; G06F 2201/805; G06F 2201/82
See application file for complete search history.

(56) References Cited

U.S. PATENT DOCUMENTS

| 6,625,688 | B1 * | 9/2003 | Fruehling | G06F 11/2236 |
|---|---|---|---|---|
| | | | | 711/109 |
| 2006/0136705 | A1 * | 6/2006 | Kaimal | G06F 21/57 |
| | | | | 713/2 |
| 2014/0205092 | A1 * | 7/2014 | Hartley | H04L 9/0866 |
| | | | | 380/44 |
| 2018/0101458 | A1 * | 4/2018 | Kumar | G06F 11/2289 |
| 2018/0121656 | A1 * | 5/2018 | Scherer, III | G06F 9/4411 |

FOREIGN PATENT DOCUMENTS

JP H04346112 A 12/1992

* cited by examiner

*Primary Examiner* — Joseph D Manoskey
(74) *Attorney, Agent, or Firm* — Eschweiler & Potashnik, LLC (57) ABSTRACT

A microcontroller system includes a processing unit, a first peripheral having a first set of registers, and an assurance module. The first peripheral is configured to receive a first reset signal that resets the first set of registers to a first actual reset value, which is expected to be a first expected value. The assurance module is configured to calculate a first signature value, which is based on the first actual reset value, in response to the first reset signal. The processing unit is configured to perform a first comparison between the calculated first signature value and a pre-determined first signature value to determine whether the microcontroller system is in a trusted safety state. The first comparison is performed in response to the first reset signal, and the pre-determined first signature value is based on the first expected value.

19 Claims, 4 Drawing Sheets

SAFE RESET TECHNIQUES FOR MICROCONTROLLER SYSTEMS IN SAFETY RELATED APPLICATIONS

BACKGROUND

For safety related applications, it is important to ensure microcontrollers correctly execute their intended functionality in all phases of the application. The execution assumes correctness of both hardware and software components with respect to their specification and fault-free execution of this functionality. In general, safety related applications are built using special measures to avoid systematic faults and to detect and react to possible random hardware faults during execution of the application.

However, when a microcontroller is first starting up or restarting from a known-state, e.g., after a reset trigger, the microcontroller executes start-up code which is built into the microcontroller during its production. If the microcontroller start-up is affected by a hardware fault during start-up, the intended functionality may no longer be performed correctly even though the rest of the hardware and software is fault-free. In other words, a fault during the start-up phase of a microcontroller may propagate to the execution of the safety related application, hence leading to a potential unsafe situation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following detailed description makes reference to the accompanying drawings which constitute a part of the disclosure and in which, for purposes of illustration, special example embodiments are shown, whereby the disclosure can be practically realized. It is understood that other example embodiments may be employed, and that structural and other changes may be implemented, without going beyond the scope of protection of the present disclosure. Thus, the following detailed description should not be regarded as being limitative. Rather, the scope of protection of the present disclosure is defined only by the accompanying patent claims.

Figure 1:
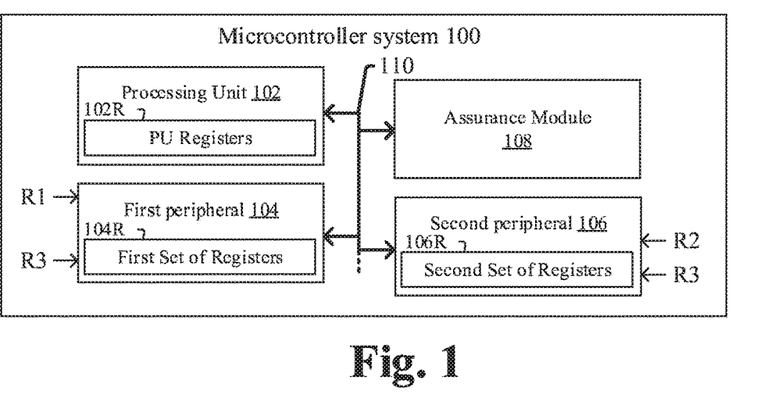
FIG. 1 illustrates a block diagram of some embodiments of a microcontroller system that makes use of safe reset operations in accordance with some embodiments.

FIG. 1 illustrates a microcontroller system 100 in accordance with some embodiments. The microcontroller system 100 includes a processing unit 102, a first peripheral 104, a second peripheral 106, and an assurance module 108. The processing unit 102, first peripheral 104, second peripheral 106, and assurance module 108 are each coupled to bus interface 110, and can communicate with one another through the bus interface in typical implementations. The processing unit 102, first peripheral 104, second peripheral 106, and assurance module 108 can be implemented as one or more integrated circuits (IC), each disposed on a semiconductor substrate such as a monocrystalline silicon substrate or silicon-on-insulator substrate, for example. In some embodiments, the assurance module 108 can be implemented as a series of computer readable instructions that are executed by the processing unit 102 to carry out desired functionality.

The first peripheral 104 has a first set of registers 104R and is configured to receive a first reset signal, R1, which resets the first set of registers 104R to a first actual reset value. The first actual reset value is expected to be a first expected reset value in response to the first reset signal, but may differ from the first expected reset value if an error of some type occurs.

The second peripheral 106 has a second set of registers 106R, which are distinct from the first set of registers 104R. The second peripheral 106 is configured to receive a second reset signal, R2, which is distinct from the first reset signal R1 and which resets the second set of registers 106R to a second actual reset value without setting or resetting the first set of registers 104R. Like the first actual reset value, the second actual reset value is expected to be a second expected reset value in response to the second reset signal R2 but may differ from the second expected reset value if an error of some type occurs.

While the first and second reset signals R1, R2 (which may be referred to in some contexts as an application reset or a system reset) each reset either the first peripheral 104 or second peripheral 106 (but not both the first and second peripherals), a third type of reset signal R3 (which may be referred to as a system reset or a power-on reset) can concurrently reset both the first peripheral 104 and the second peripheral 106. It will be appreciated that the term "reset" as used in the application can include what are referred to in some contexts as "reset" operations where a digital bit of a register is "reset" to a logical value of zero, but can also include what are referred to in some contexts as "set" operations where a digital bit of a register is "set" to a logical value of one. Thus, the term "reset" shall be interpreted to program a register to some predetermined state, and is not to be limited solely to programming a register to a logical zero state.

Whatever the particular type of reset signal that is received, if a system glitch, alpha-particle strike, or other un-expected event occurs during reset of the first peripheral 104 and/or second peripheral 106, the first actual reset value for the first set of registers 104R and/or second actual reset value for the second set of registers 106R could differ from the first expected reset value and/or second expected reset value, respectively. For example if the first expected reset value is 0x0000 but an un-expected event causes the first actual reset value immediately after reset to be in a state of 0x0100, the difference between the first expected reset value and the first actual reset value could indicate a fault occurred during reset of the first peripheral 104, which could potentially lead to problems in the microcontroller system 100.

Figure 2:
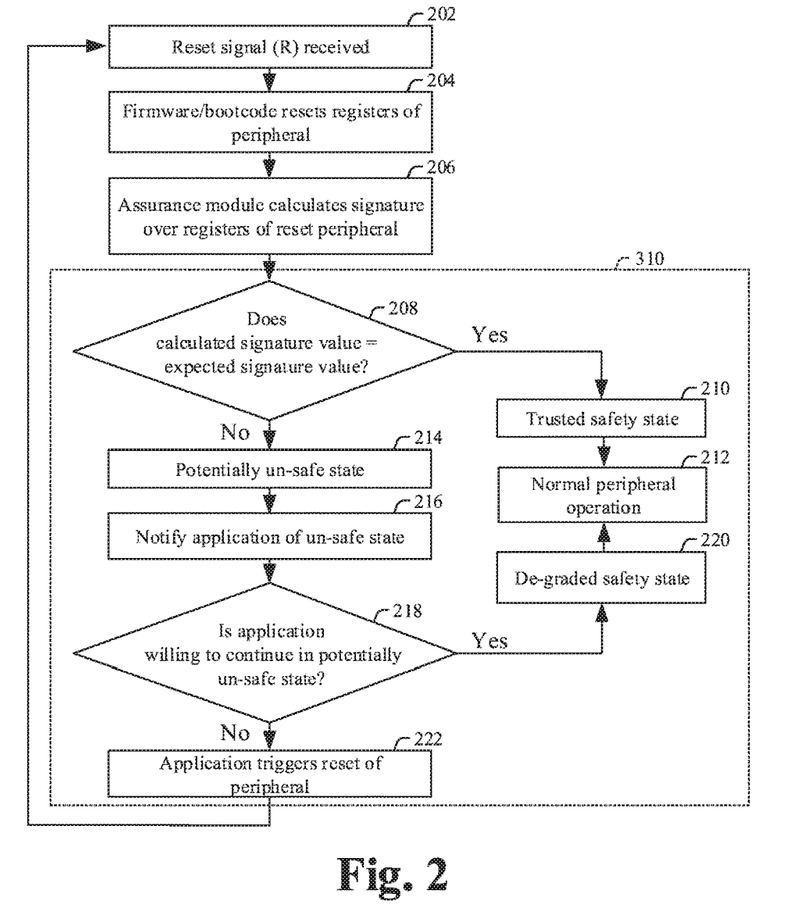
FIG. 2 illustrates a flow diagram of some embodiments of a method for safe reset operations in accordance with some embodiments.
Figure 3:
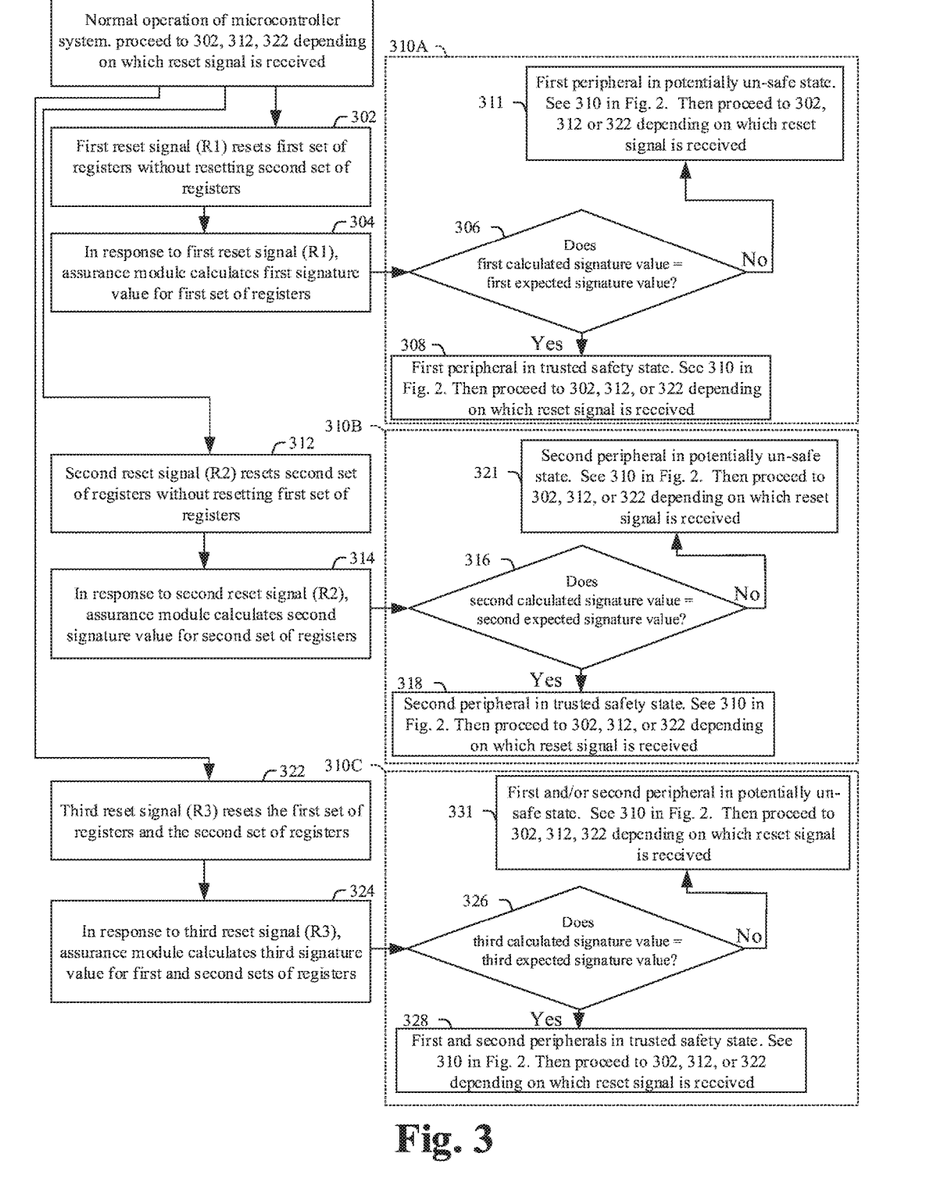
FIG. 3 illustrates a flow diagram of some embodiments of a method for safe reset operations in accordance with some embodiments.

Accordingly, the assurance module 108 is configured to calculate signature values for the first and second peripherals 104, 106 immediately after their respective resets to help ensure the first and second peripherals 104, 106 have reset to a trusted state, as now described in more detail with regards to the flow diagrams of FIGS. 2-3 for example. Although FIGS. 2-3 are described as a series of acts, it will be appreciated that these acts are not limiting in that the order of the acts can be altered in other embodiments, and the methods of FIG. 2-3 are also not limited to the structure of FIG. 1, but are applicable to other structures. In other embodiments, some acts that are illustrated and/or described may be omitted in whole or in part. The same is true to other methods disclosed herein, such as the flowchart illustrated in FIG. 5.

Referring now to FIG. 2, in block 202, a reset signal is received by a peripheral, such as first peripheral 104 or second peripheral 106 in FIG. 1 for example.

In block 204, the processing unit 102 learns of the reset signal and executes firmware and/or boot code from read only memory (ROM) and/or flash memory. This firmware and/or boot-code resets registers of the peripheral, meaning that the firmware and/or boot-code installs to an initial state. For example, in the example of FIG. 1, upon learning the first reset R1 has been asserted, the processing unit 102 may execute firmware and/or boot code that resets the first set of registers 104R. For example, if the first peripheral 104 is a timer module that interfaces to a 32-bit bus interface, the timer module can include a 32-bit control register, a 32-bit input data register, and a 32-bit output data register. Ideally, the registers of the peripheral will be set or reset to their expected reset values; however, un-expected events could cause the actual reset values of the registers to differ from their expected reset values. For example, in some instances the reset signal can be expected to set the control register of the timer module to a predetermined value (e.g., 0x0000_0011, in hexadecimal) while concurrently resetting the input data register and output data register to predetermined values (e.g., 0x0000_0000); or alternatively can be expected to set the control register of the timer module to the predetermined value (e.g., 0x0000_0011) while leaving the input data register and/or output data register unchanged.

In block 206, in response to the reset signal, the assurance module 108 calculates a signature over registers of the peripheral which was reset. For example, continuing with the example described in the previous paragraph and referencing FIG. 1, in response to a first reset signal R1 being asserted, the assurance module 108 can calculate a checksum, hash, or other assurance value over the first set of registers 104R to obtain the calculated signature value immediately after the first peripheral 104 is reset. The first signature value is based on the first actual reset value contained in the first set of registers 104R immediately after reset. For instance, when the first peripheral 104 is a timer module whose control register was expected to be reset to 0x000_0011, in some embodiments the assurance module 108 can calculate a checksum (e.g., a 1 byte or 8-bit checksum) based solely on the actual reset value in the control register of the timer module. In other embodiments, the assurance module 108 can calculate the checksum (e.g., a 1 byte or 8-bit checksum) over the actual values in the control register, input data register, and output data register. Thus, the calculated signature takes into account the actual way in which the peripheral was reset by reading an actual reset value from the registers of the peripheral. The first signature value can be a single-bit (e.g., parity bit), a multi-bit checksum, a hash value, a cyclic-redundancy check, or another assurance value, which is typically smaller in bitsize than the full set of registers which are checked to limit memory consumed and to improve processing speed in some regards.

In block 208, the processing unit 102 and/or assurance module 108 determines whether the calculated signature value is bitwise identical to an expected signature value. Thus, continuing with the example described with regard to FIG. 1, after the first signature value has been calculated, the processing unit 102 and/or assurance module 108 performs a first comparison between the calculated first signature value and a pre-determined first signature value to determine whether the microcontroller system 100 is in a trusted safety state. The pre-determined first signature value can be determined before the reset occurs, and can, for example, be provided for by application program (e.g., software) running on the microcontroller system 100 and/or otherwise stored in memory. The first comparison is performed in response to the first reset signal R1, and the pre-determined first signature value is based on the first expected reset value and is independent of the first actual reset value read from the first set of registers 104R. Often, the microcontroller system 100 is deemed to be in the trusted safety state when the calculated first signature value is bitwise identical to the expected first signature value.

If the calculated signature value is equal to the expected signature value (YES at 208), then the microcontroller system 100 is deemed to be in a trusted safety state in block 210, and normal operation of the peripheral and/or microcontroller system 100 ensues in 212.

If, however, the calculated signature value differs from the expected signature value (NO at 208), then the microcontroller system is deemed to be a potentially un-safe state in 214. Accordingly, the processing unit 102 and/or assurance module 108, typically through operating system software running on the microcontroller system 100, notifies the application software of the potentially un-safe state in 216.

In 218, the application software can notify the microcontroller system 100, typically through the operating system, whether it is willing to continue to operate the peripheral and/or microcontroller system 100 in the potentially un-safe state. If the application is willing to continue in the potentially un-safe state (YES at 218), then the microcontroller system may be deemed in a de-graded safety state in 220, but normal peripheral operation is still carried on in 212.

On the other hand, if the application determines that it is not willing to continue in the potentially un-safe state (NO at 218), then the application can provide an instruction that triggers another reset of the peripheral and can prevent the peripheral from entering normal operation. In this way, the application has discretion to determine how dangerous the un-safe state truly is, and can take appropriate action. For example, if the microcontroller system 100 is implemented in an automotive system, the application may determine that the un-safe state is too un-safe to allow the vehicle to operation, and may take precautions that prevent the vehicle from starting its engine for example.

FIG. 3 shows another method of safe reset in accordance with some embodiments and which may be combined in various manners with the embodiment of FIG. 2. Compared to FIG. 2, which was illustrated with only a single reset signal, the embodiment of FIG. 3 makes use of three different reset signals, namely: a first reset signal R1 (see block 302), a second reset signal R2 (see block 312), and a third reset signal R3 (see block 322), which reset different peripherals and/or different combinations of peripherals. For purposes of illustration and clarity, an example implementation of the method of FIG. 3 will be described below with regards to the microcontroller system of FIG. 1.

At 302, a first reset signal resets a first set of registers for a first peripheral without resetting a second set of registers for a second peripheral. For example, with regards to previous FIG. 1, a first reset signal R1 can reset the first peripheral 104, such that the first set of registers 104R are reset to a first predetermined value, without setting or resetting the second set of registers 106R.

At 304, a first actual signature value is calculated for the first set of registers 104R. In some embodiments, this first actual signature value can be calculated when the assurance module 108 reads the first actual reset value in the first set of registers 104R, and then determines the first actual signature value based on the actual reset value read from the first set of registers 104R. For example, if the first set of registers is reset 104R is actually reset to 0x0010_0000, and the first actual signature value is a simple checksum that provides a single parity bit indicating whether the sum of the first actual reset value bits, then the signature value would be "1" in this example.

At 306, the method determines whether the first calculated signature value is equal to a first expected signature value. The first expected signature value can be stored in memory and can be predetermined prior to the first reset signal being asserted. For example, if the first set of registers were expected to be reset to 0x0000_0000, then the corresponding parity bit checksum would be "0" for the first expected signature value.

If the calculated signature value is equal to the expected signature value (YES at 306), then the microcontroller system 100 is deemed to be in a trusted safety state in block 308. See 310 in FIG. 2. The method then proceeds continues to operate in a trusted safety state until another reset signal is received. Depending on whether the first reset signal R1, second reset signal R2, or third reset signal R3 is received, the method can proceed to 302, 312, or 322, respectively.

If, however, the calculated signature value differs from the expected signature value (NO at 306), then the first peripheral 104 (and hence microcontroller system 100) is deemed to be a potentially un-safe state in 311. See 310 in FIG. 2. For example, in our example in the previous several paragraphs, the first calculated signature is a "1" and the first expected signature is a "0", so the first peripheral 104 would be in a potentially un-safe state, meaning that the for whatever reason the bits of the first register 104R did not reset as expected. As shown in block 310 in FIG. 2, if the application wishes to proceed in the potentially un-safe state, then it can do so and normal operation of the first peripheral 104 is carried out; or alternatively, if the application is unwilling to proceed in the potentially un-safe state, the application can trigger a reset of the first peripheral 104, for example by re-asserting the first reset signal R1. Whichever the case, at some point in time, another reset signal can be received will be received in FIG. 3. Depending on whether the first reset signal R1, second reset signal R2, or third reset signal R3 is received, the method can proceed to block 302, block 312, or block 322, respectively.

At 312, a second reset signal R2 resets a second set of registers 106R for a without resetting the first set of registers 104R for the first peripheral 104. For example, with regards to previous FIG. 1, the second reset signal R2 can reset the second peripheral 106, such that the second set of registers 106R are reset to a second predetermined value, without setting or resetting the first set of registers 104R.

At 314, the assurance module calculates a second actual signature value for the second set of registers 106R. This second actual signature value is calculated by the assurance module reading the value in the second set of registers 106R, and then determining the second actual signature value based on the value read from the second set of registers 106R.

At 316, the method determines whether the second calculated signature value to a second expected signature value. The second expected signature value can be stored in memory and can be predetermined prior to the second reset signal R2 being asserted.

If the second calculated signature value is equal to the second expected signature value (YES at 316), then the microcontroller system 100 is deemed to be in a trusted safety state in block 318. See 310 in FIG. 2. The method then proceeds continues to operate in a trusted safety state until another reset operation is received. Depending on whether the first reset signal R1, second reset signal R2, or third reset signal R3 is received, the method can proceed to 302, 312, or 322, respectively.

If, however, the calculated signature value differs from the second expected signature value (NO at 306), then the second peripheral (and hence microcontroller system 100) is deemed to be a potentially un-safe state in 321. See 310 in FIG. 2. If the application wishes to proceed in the potentially un-safe state, then it can do so and normal operation of the second peripheral 106 is carried out; or alternatively, if the application is unwilling to proceed in the potentially un-safe state, the application can trigger a reset of the second peripheral 106, for example by re-asserting the second reset signal R2. Whichever the case, at some point in time, another reset signal can be received. Depending on whether the first reset signal R1, second reset signal R2, or third reset signal R3 is received, the method can proceed to block 302, block 312, or block 322, respectively.

At 322, a third reset signal resets both the first set of registers 104R for the first peripheral 104 and the second set of registers 106R for a second peripheral 106.

At 324, the assurance module calculates a third actual signature value over the first set of registers 104R and over the second set of registers 106R. This third actual signature value is calculated by the assurance module reading the value in the first set of registers 104R and the second set of registers 106R, and then determining a third actual signature value based on the values read from the first and second sets of registers.

At 326, the method determines whether the third calculated signature value to a third expected signature value. The third expected signature value can be stored in memory and can be predetermined prior to the third reset signal being asserted.

If the third calculated signature value is equal to the third expected signature value (YES at 326), then the microcontroller system 100 is deemed to be in a trusted safety state in block 328. See 310 in FIG. 2. The method then proceeds continues to operate in a trusted safety state until another reset operation is received. Depending on whether the first reset signal R1, second reset signal R2, or third reset signal R3 is received, the method can proceed to 302, 312, or 322, respectively.

If, however, the calculated signature value differs from the third expected signature value (NO at 326), then at least one of the first peripheral 104 and/or second peripheral 106 (and hence microcontroller system 100) is deemed to be a potentially un-safe state in 331. See 310 in FIG. 2. If the application wishes to proceed in the potentially un-safe state, then it can do so and normal operation of the first peripheral 104 and second peripheral 106 is carried out; or alternatively, if the application is unwilling to proceed in the potentially un-safe state, the application can trigger a reset of both the first peripheral 104 and second peripheral 106, for example by re-asserting third reset signal R3. Whichever the case, at some point in time, another reset signal can be received. Depending on whether the first reset signal, second reset signal, or third reset signal is received, the method can proceed to block 302, block 312, or block 322, respectively.

Figure 4:
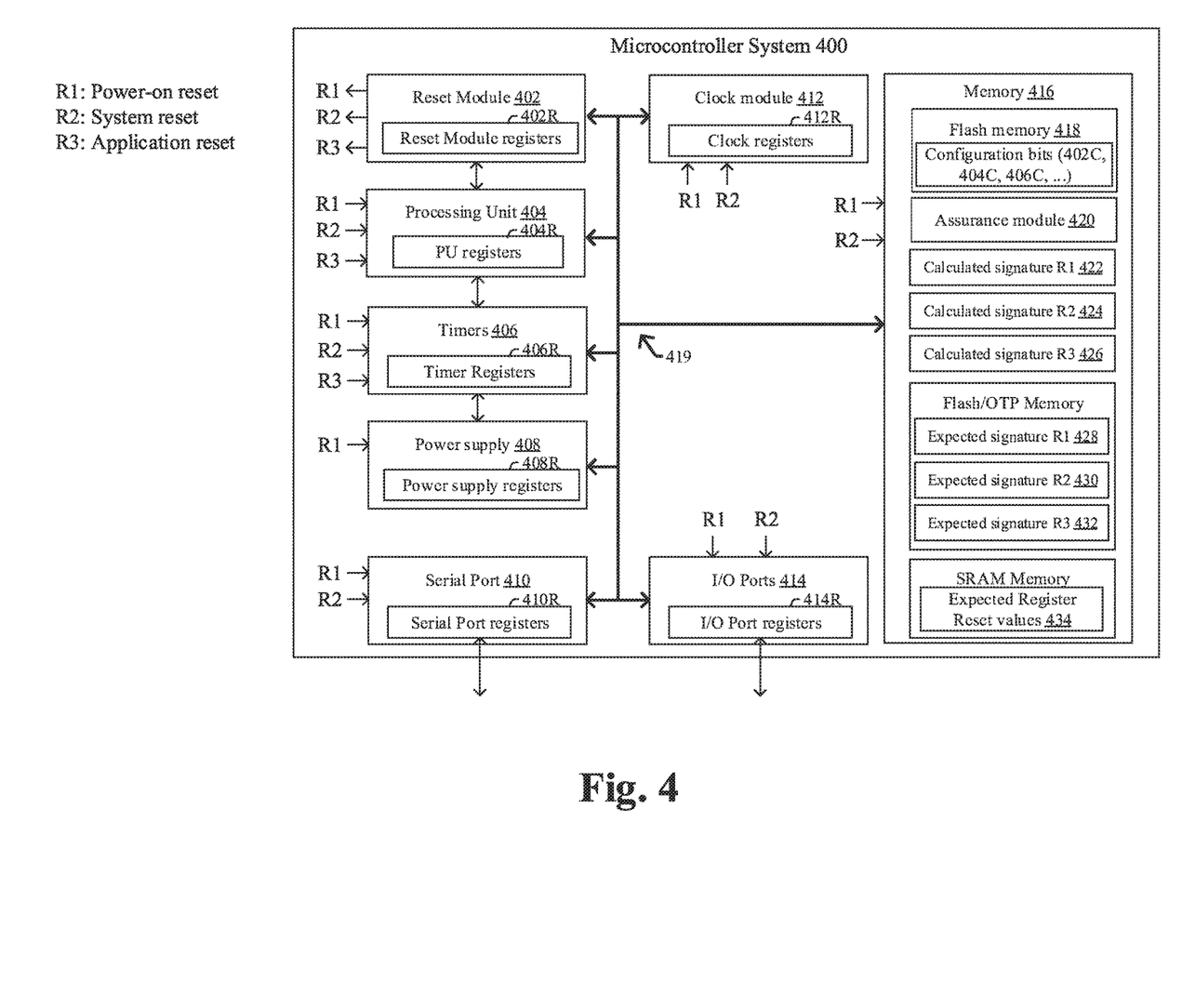
FIG. 4 illustrates a block diagram of some embodiments of a microcontroller system that makes use of safe reset operations in accordance with some embodiments.

FIG. 4 illustrates another microcontroller system 400 in accordance with some embodiments. The microcontroller system 400 includes a reset module 402, a processing unit 404, and a number of peripherals/modules, which include timers 406, a power supply 408, a serial port 410, a clock module 412, and input/output (I/O) port 414 and a memory 416. The processing unit 404 and the peripherals are operably coupled to one another through a bus interface 419, such as an N-bit bus interface, where N is typically 8, 16, 32, 64, 128, etc. Thus, in various embodiments, any of the peripherals 406-416 can correspond to a first peripheral or second peripheral as previously described with regards to FIGS. 1-3, and as such can exhibit corresponding functionality. A more detailed working example in accordance with some embodiments is described below.

The reset module 402 provides multiple reset signals, including a first reset signal R1 (e.g., a power-on reset signal), a second reset signal R2 (e.g., system reset), and a third reset signal R3 (e.g., an application reset signal). The reset signals can be provided to the various modules over the bus interface 419 or through separate reset lines, and can reset different combinations of modules. For example, the first reset signal R1 can reset all modules in the microcontroller system 400, including the processing unit 404, timers 406, power supply 408, serial port 410, clock module 412, I/O ports 414 and memory 416. The second reset signal R2 can reset a first subset of the modules, including the processing unit 404, timers 406, serial port 410, clock module 412, I/O ports 414 and memory 416 (but not the power supply 408). The third reset signal R3 can reset a second subset of the modules, including the processing unit 404 and timers 406 (but not the serial port 410, power supply 408, clock module 412, I/O ports 414 or memory 416).

To verify that the modules, immediately after receiving a reset signal and correspondingly undergoing a reset operation, are in fact in an expected state after the reset operation; an assurance module 420 is included. More detailed functionality of the microcontroller system 400 of FIG. 4 is described below with regards to FIG. 5.

Figure 5:
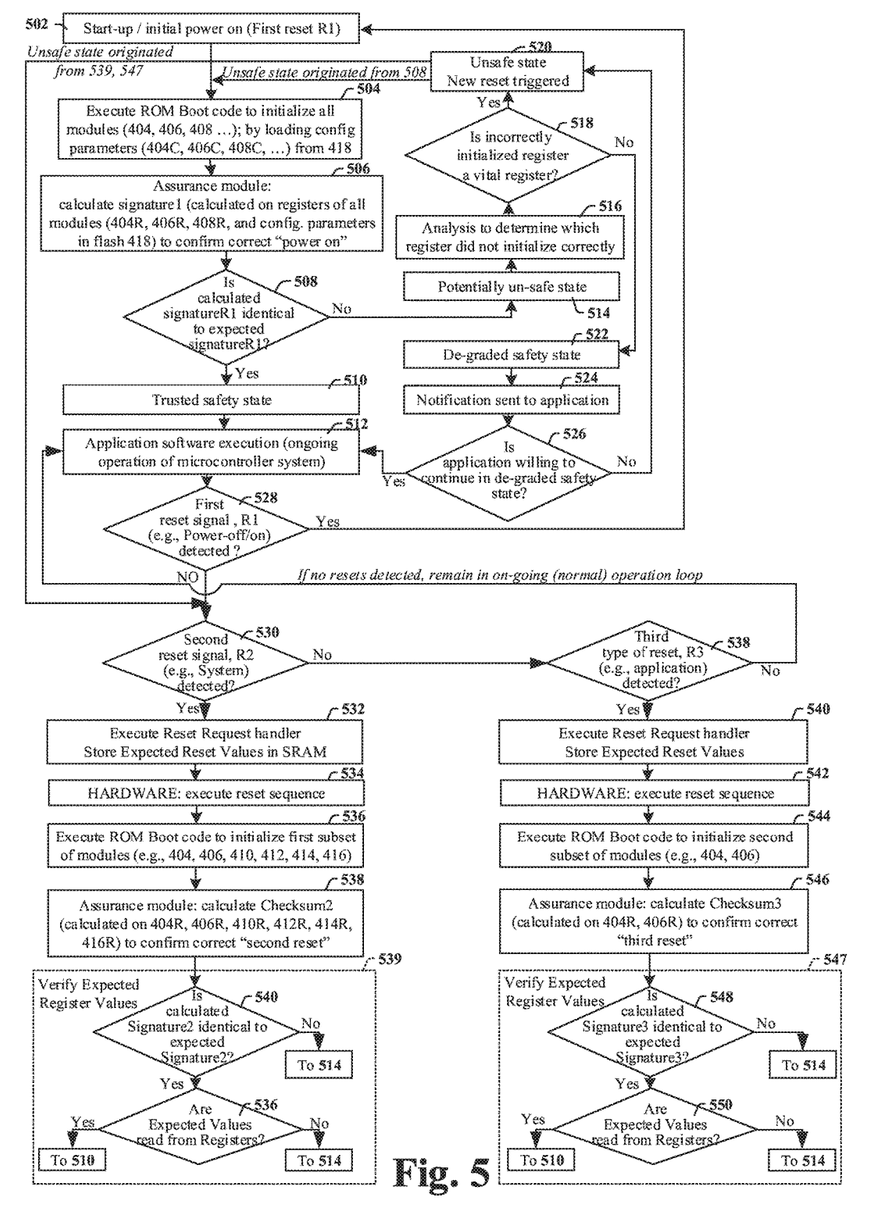
FIG. 5 illustrates a flow diagram of some embodiments of a method for safe reset operations in accordance with some embodiments, and is described in non-limiting fashion with regards to FIG. 4.

At block 502, the microcontroller system 400 starts-up and powers-on, for example after being triggered by a user event, such as a user putting a key into a vehicles ignition or bringing a wireless keychain into range of the automobile, for example.

In 504, in response to the start-up, the microcontroller executes boot code, which is typically stored in flash memory 418 and/or read only memory (ROM) to initialize all modules. During this block, the processing unit 404 loads configuration parameters (e.g., 404C, 406C, 408C, . . . ) into the corresponding modules (e.g., 404, 406, 408, . . . , respectively). For example, these configuration parameters may set the initial power configuration of the power supply 408, set the initial clock rate for clock module 412, etc. The boot code can be different for different microcontroller systems and/or for different customers, which allows for good product diversification.

In 506, the assurance module 420 calculates a first actual signature value for the reset peripherals to ensure the microcontroller system powered-on correctly. For example, because modules 404, 406, 408, 410, 412, 414, and 418 were reset during power on, the assurance module can calculate a single checksum over registers 404R, 406R, 408R, 410R, 412R, 414R, and over flash memory 418, and can store the first calculated signature value for R1 in memory in location 422. Alternatively, the first calculated signature value for R1 can be stored in other portions of memory 416, or if the assurance module is implemented a dedicated hardware module the first calculated signature value can be stored within the assurance module. In some embodiments, the first calculated signature value 422 can be a single byte or word to limit storage consumption, but can also be multiple bytes or words.

In 508, the processing unit 404 and/or assurance module 420 determines whether the first calculated signature 422 is identical to a first expected signature 428. The first expected signature 428 can be based on expected register reset values 434 which are stored in memory and also based on the configuration parameters stored in flash memory 418. For example, an application running on the system can include these expected register reset values 434 for the timers 406, power supply 408 and/or clock module 412, among others, as part of its programming code, which can provide users/customers with some flexibility in how the system operates. The first signature value can then be based on these expected register reset values, thereby allowing errors during reset to be detected.

If the first calculated signature 422 is identical to the first expected signature 428 (YES At 508), then the system enters a trusted safety sate in 510. The system then continues on to 512 where the application software executes and on-going operation of the microcontroller system continues until a reset signal is received.

On the other hand, if the first calculated signature 422 differs from the first expected signature 428 (NO at 508), at least one register which was reset did not reset to its expected reset value, and the system is in a potentially unsafe state in 514. The system can then perform analysis to determine which register did not initialize correctly in block 516. For example, the system can read an actual reset value from each register which was to be reset, and then compare the actual reset value to an expected register reset value for that register (434) which can be stored in SRAM within memory 416, for example.

In 518, after identifying which group of registers did not reset correctly, the system determines whether the group of incorrectly initialized registers includes a vital register. If a vital register is included in the group (YES at 518), then the system is deemed to be in an unsafe state in 520, and the second reset signal (e.g., system reset) is again applied without seeking input from the application. In this way, operation of the system, such as a vehicle, is prevented in the case where a vital register has not initialized correctly. On the other hand, if no vital register are included (NO at 518), then the system is deemed to be in a de-graded safety state in 522. In such a de-graded safety state, a notification is sent to the application in 524, and the application is provided with an option as to whether it is willing to continue system operation in a de-graded safety mode in block 526. If the application is not willing to continue (NO at 526), then the system is again to be in an unsafe state and the first reset signal is re-applied. If the application is willing to continue in the de-graded safety state (YES at 526), then the system then continues on to 512 where the application software executes and on-going operation of the microcontroller system continues until a reset signal is received.

During on-going operation in 512, the system can be interrupted at any time by a first reset signal, second reset signal, or third reset signal in this example, and thus the system can be thought of as looping through blocks 512, 528, 530, and 538 in on-going fashion until a reset is received, at which time it will fall out of the loop to address the reset before re-entering the loop when returning to normal operation. In other examples, other number of reset signals can be present. For example, in some cases, only a single reset can be present, while in other cases a large number of different types of resets can be present, each of which can potentially reset a different combination of peripherals and/or modules.

At 528, the system determines if the first reset signal R1 (e.g., power on reset) is received. If so, the system returns to 502 and/or 504 as previous described; while if not, the system continues to 530.

At 530, the system determines if the second reset signal R2 (e.g., system reset) is received. If so (YES at 530), a reset request handler stores expected reset values in SRAM 434, (532) and the hardware executes the reset sequence corresponding to the second reset signal in 534. In 536, ROM boot-code is executed to initialize a first subset of modules. For example, with regards to FIG. 4, the second reset signal can reset a first subset of modules that includes processing unit 404, timers 406, serial port 410, clock module 412, I/O ports 414, and memory 416. Thus, the second reset signal does not reset power supply 408, which is not included in the first subset of modules. In response to this boot code execution, the registers of each module/peripheral for the first subset of modules will reset to an actual reset value. If a reset module is reset correctly, the actual reset value for registers of the module will be the same as an expected reset value for registers of the module. However, if an unexpected event occurs (e.g., alpha-particle strike, device failure), the actual reset value for registers of the module can differ from the expected reset value for that register of the module.

To ensure the modules of the first subset reset correctly, in block 538, the assurance module 420 calculates a second signature value over the registers of the first subset of modules. For example, with regards to FIG. 4, the second signature value can be calculated over PU registers 404R, timer registers 406R, serial port registers 410R, clock module registers 412R, I/O port registers 414R, and configuration bits in flash memory 418. Thus, the second signature value is not calculated over power supply registers 408R because the power supply 408 was not included in the first subset of modules. In some embodiments, the second signature value can be the same length as the first signature value, even though it is calculated over a different length of registers.

In block 539, the register values for the first subset of modules are verified. Thus, in 540, if the second calculated signature is not identical to the second expected signature (NO at 540), the system returns to 514 as previously described. If the second calculated signature is identical to the second expected signature (YES at 540), the system can return to 510 (trusted safety state) or as optionally illustrated can continue to 536 to verify the expected reset values are read from the registers. In 536, the system can read actual values from each register to confirm that the actual register values are the same as the expected reset values stored in memory. Again, if the actual reset values are the same as the expected reset values, the system returns to 510 (trusted safety state), whereas if differences are detected the system returns to 514. It is worth noting that in typical embodiments, only a very small number of registers—for example, only those which are deemed extremely critical—are handled/checked in this manner (532, 536). For example, although the example described above resets processing unit 404, timers 406, serial port 410, clock module 412, I/O ports 414, and memory 416; in more typical embodiments only extremely critical registers—such as key control registers from clock module 412—will be read and expected values stored by the reset request handler into SRAM at 532 and then checked at 536. This is because resetting (and checking) more registers tends to increase reset and boot time, so by keeping the number of registers as small as possible improves operational performance in some regards.

At 538, the system determines if the third reset signal R3 (e.g., application reset) is received. If so (YES at 538), a reset request handler stores expected reset values in SRAM 434 (540), and the hardware executes the reset sequence corresponding to the third reset signal in 542. In 544, ROM boot-code is executed to initialize a second subset of modules, which differs from the first subset of modules. For example, with regards to FIG. 4, the third reset signal can reset a second subset of modules that includes processing unit 404 and timers 406. Thus, the third reset signal does not reset power supply 408, serial port 410, clock module 412, I/O ports 414, and/or memory 416, which are not included in the second subset of modules. In response to this boot code execution, the registers of each module/peripheral for the second subset of modules will reset to an actual reset value. If a reset module is reset correctly, the actual reset value for registers of the module will be the same as an expected reset value for registers of the module. However, if an unexpected event occurs (e.g., alpha-particle strike, device failure), the actual reset value for registers of the module can differ from the expected reset value for that register of the module.

To ensure the modules of the second subset reset correctly, in block 546, the assurance module 420 calculates a third signature value over the registers of the second subset of modules. For example, with regards to FIG. 4, the third signature value can be calculated over PU registers 404R and timer registers 406R. Thus, the second signature value is not calculated over power supply registers 408R, serial port registers 410R, clock module registers 412R, I/O port registers 414R, and configuration bits in flash memory 418 because these modules/peripherals are not included in the second subset of modules. In some embodiments, the third signature value can be the same length as the first signature value, even though it is calculated over a different length of registers.

In block 547, the register values for the second subset of modules are verified. Thus, in 548, if the third calculated signature is not identical to the third expected signature (NO at 548), the system returns to 514 as previously described. If the third calculated signature is identical to the third expected signature (YES at 548), the system can return to 510 (trusted safety state) or as optionally illustrated can continue to 550 to verify the expected reset values are read from the registers. In 550, the system can read actual values from each register to confirm that the actual register values are the same as the expected reset values stored in memory. Again, if the actual reset values are the same as the expected reset values, the system returns to 510 (trusted safety state), whereas if differences are detected the system returns to 514.

In some embodiments, resets occur during an initial safe start-up mode when the assurance module has wide access to system resources. Further, the assurance module 420 performs a comparison between the calculated signature value and the expected signature value during the safe start-up mode, which can be prior to the initialization of the application software. Thus, in some cases, after the initial safe start-up mode is over, the system enters a normal operational mode when application software begins to run. During the normal operational mode, security measures may be in place to prevent the application software from accessing all system resources. To cope with this limitation on application software, the assurance module will notify the application (e.g., commensurate with block 524) by writing a value to a predetermined memory location or by storing the value in one of its own registers, such that the application, upon initializing, can read from the predetermined memory location or the registers of the assurance module to learn which modules, if any, have initialized incorrectly. In this way, the application can learn of the incorrectly initialized modules during normal operation (e.g., after the initial safe start-up mode is completed), and can decide in blocks 522-526 whether to proceed with operation or induce another reset. In comparison, in some embodiments block 518 is carried out during the initial safe start up mode, such that when an incorrectly initialized register is a vital register (YES in 518) a reset is again issued during the initial safe start-up mode and before application software even begins to run, which helps ensure safe operation of the system.

Thus, some embodiments of the present disclosure relate to a microcontroller system. The microcontroller system includes a processing unit, a first peripheral, and an assurance module. The first peripheral is connected to the processing unit through a bus interface and has a first set of registers. The first peripheral is configured to receive a first reset signal that resets the first set of registers to a first actual reset value. The first actual reset value is expected to be a first expected value in response to the first reset signal. The assurance module is configured to calculate a first signature value in response to the first reset signal. The first signature value is based on the first actual reset value. The processing unit is configured to perform a first comparison between the calculated first signature value and a pre-determined first signature value to determine whether the microcontroller system is in a trusted safety state. The first comparison is performed in response to the first reset signal, and the pre-determined first signature value is based on the first expected value.

Other embodiments relate to a method for safe reset in a system that includes a microcontroller and a plurality of registers. In the method, a reset signal is detected, and at least some of the plurality of registers are reset based on the reset signal, wherein the resetting is expected to set the at least some of the plurality of registers to respective predetermined initialization values. The method calculates a signature value based on the predetermined initialization values; and determines whether the at least some of the plurality of registers have initialized correctly by comparing the calculated signature value to a predetermined signature value. The system is operated in a trusted state only if the calculated signature value is bitwise identical to the predetermined signature value. If the calculated signature value differs from the predetermined signature value, the system enters a degraded safety state or un-safe state.

Still other embodiments relate to a microcontroller system that includes a processing unit, a plurality of peripherals coupled to the processing unit through a bus interface, and a reset module coupled to the processing unit and the plurality of peripherals. The reset module is configured to provide a plurality of reset signals which reset different combinations of the plurality of peripherals. A first reset signal resets a first combination of the plurality of peripherals and a second reset signal resets a second combination of the plurality of peripherals. An assurance module is configured to calculate a first signature value in response to the first reset signal and calculate a second signature value in response to the second reset signal. The first signature value is based on actual reset values for registers of the first combination of the plurality of peripherals and the second signature value is based on actual reset values for registers of the second combination of the plurality of peripherals.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A microcontroller system, comprising:
 a processing unit;
 a first peripheral connected to the processing unit through a bus interface and having a first set of registers, wherein the first peripheral is configured to receive a first reset signal that resets the first set of registers to a first actual reset value that differs from a first expected reset value; and
 an assurance module configured to calculate a first signature value in response to the first reset signal, wherein the first signature value is based on the first actual reset value; and
 wherein the processing unit is configured to perform a first comparison between the calculated first signature value and a pre-determined first signature value to determine whether the microcontroller system is in a trusted safety state, wherein the first comparison is performed in response to the first reset signal, and wherein the pre-determined first signature value is based on the first expected reset value.

2. The microcontroller system of claim 1, wherein the microcontroller system is in the trusted safety state when the calculated first signature value is bitwise identical to the pre-determined first signature value.

3. The microcontroller system of claim 1, wherein the processing unit is configured to selectively flag an error based on whether the calculated first signature value differs from the pre-determined first signature value to thereby indicate the microcontroller system is in a potentially un-safe state.

4. The microcontroller system of claim 3, wherein the processing unit is configured to provide a notification to an application program that the microcontroller system is in the potentially un-safe state, and is further configured to, based on an instruction received from the application program in response to the notification, selectively reset the first peripheral or allow the first peripheral to continue to operate in the potentially un-safe state without being reset.

5. The microcontroller system of claim 1, further comprising:
 a second peripheral connected to the processing unit through the bus interface and having a second set of registers, wherein the second peripheral is configured to receive a second reset signal that resets the second set of registers to a second actual reset value without setting or resetting the first set of registers, and wherein the second actual reset value is expected to be a second expected reset value.

6. The microcontroller system of claim 5, wherein the first reset signal resets the first set of registers without setting or resetting the second set of registers.

7. The microcontroller system of claim 5, wherein the assurance module is further configured to calculate a second signature value in response to the second reset signal, wherein the second signature value is based on the second actual reset value and is independent of the first actual reset value; and wherein the processing unit is configured to perform a second comparison between the calculated second signature value and a pre-determined second signature value, wherein the second comparison is performed in response to the second reset signal and dictates whether the microcontroller system is in the trusted safety state.

8. The microcontroller system of claim 5, wherein the first and second peripherals are each configured to receive a third reset signal that resets the first register to the first actual reset value and resets the second register to the second actual reset value, wherein the assurance module is further configured to calculate a third signature value in response to the third reset signal, wherein the third signature value is based on the second actual reset value and is independent of the first actual reset value; and wherein the processing unit is configured to perform a third comparison between the calculated third signature value and a pre-determined third signature value, wherein the third comparison is performed in response to the second reset signal and dictates whether the microcontroller system is in the trusted safety state.

9. The microcontroller system of claim 1, wherein the assurance module comprises a set of executable instructions stored as fixed values in read-only memory (ROM).

10. The microcontroller system of claim 1, wherein the assurance module comprises a set of executable instructions stored as fixed values in one-time-programmable (OTP) memory.

11. The microcontroller system of claim 1, wherein the assurance module is implemented as logic circuitry disposed on a semiconductor substrate.

12. A method for safe reset in a system including a microcontroller and a plurality of registers, the method comprising:

detecting a reset signal, and resetting at least some of the plurality of registers based on the reset signal, wherein the resetting sets at least one of the plurality of registers to respective actual reset values that differ from expected initialization values;

calculating a signature value based on the actual reset values;

determining whether the at least some of the plurality of registers have initialized correctly by comparing the calculated signature value to a predetermined signature value, the predetermined signature value based on the expected initialization values; and operating the system in a trusted state only if the calculated signature value is bitwise identical to the predetermined signature value, and entering a degraded safety state or un-safe state if the calculated signature value differs from the predetermined signature value.

13. The method of claim 12, further comprising:
in the degraded safety state, identifying an incorrect register within the at least some of the plurality of registers, wherein the incorrect register failed to initialize to its expected predetermined initialization value;

determining whether the incorrect register is a vital register; and based on whether the incorrect register is a vital register or not, selectively resetting the incorrect register or selectively operating the system in the degraded safety state.

14. The method of claim 13, wherein if the incorrect register is a vital register then the system is deemed to be in an unsafe state, and the incorrect register is reset after the incorrect register is identified without allowing the system to operate in the unsafe state.

15. The method of claim 13, wherein if the incorrect register is not a vital register, a notification is sent to an application, and the application selects whether to operate the system in the degraded safety state or to reset the incorrect register without allowing the system to continue to operate in the degraded safety state.

16. A microcontroller system, comprising:
a processing unit;
a plurality of peripherals coupled to the processing unit through a bus interface;
a reset module coupled to the processing unit and the plurality of peripherals, the reset module configured to provide a plurality of reset signals which reset different combinations of the plurality of peripherals, wherein a first reset signal resets a first combination of the plurality of peripherals and a second reset signal resets a second combination of the plurality of peripherals; and
an assurance module configured to calculate a first signature value in response to the first reset signal and calculate a second signature value in response to the second reset signal, wherein the first signature value is based on actual reset values for registers of the first combination of the plurality of peripherals and the second signature value is based on actual reset values for registers of the second combination of the plurality of peripherals;
wherein the processing unit is configured to perform a first comparison between the calculated first signature value and a pre-determined first signature value to determine whether the microcontroller system is in a trusted safety state, wherein the first comparison is performed in response to the first reset signal, and wherein the pre-determined first signature value is based on expected reset values for the registers of the first combination of the plurality of peripherals.

17. The microcontroller system of claim 16, wherein the processing unit is configured to perform a second comparison between the calculated second signature value and a pre-determined second signature value to determine whether the microcontroller system is in the trusted safety state, wherein the second comparison is performed in response to the second reset signal, and wherein and the pre-determined second signature value is based on expected reset values for the registers of the second combination of the plurality of peripherals.

18. The microcontroller system of claim 16, wherein the assurance module comprises a set of executable instructions stored as fixed values in read-only memory (ROM) or one-time-programmable (OTP) memory.

19. The microcontroller system of claim 16, wherein the assurance module is implemented as logic circuitry disposed on a semiconductor substrate.

* * * * *